United States Patent [19]

Kawasaki

[11] Patent Number: 5,294,048
[45] Date of Patent: Mar. 15, 1994

[54] APPARATUS FOR CONTROLLING VENTILATION FAN

[75] Inventor: Masahiko Kawasaki, Komaki, Japan

[73] Assignee: Matsushita Seiko Co., Ltd., Osaka, Japan

[21] Appl. No.: 960,062

[22] Filed: Oct. 14, 1992

[30] Foreign Application Priority Data

Oct. 18, 1991 [JP] Japan .................. 3-270755

[51] Int. Cl.$^5$ ............................. B60H 1/24
[52] U.S. Cl. ................... 236/49.3; 454/256; 454/343; 73/31.02
[58] Field of Search .............. 236/49.3, 46 R, 46 F, 236/78 D; 454/239, 909, 256, 343, 75; 340/632, 633, 634, 628; 73/23.21, 23.34, 31.02, 31.03, 31.05, 31.06

[56] References Cited

U.S. PATENT DOCUMENTS

| | | | |
|---|---|---|---|
| 4,930,407 | 6/1990 | Holter et al. | 454/75 |
| 4,992,965 | 2/1991 | Holter | 236/49.3 X |
| 5,062,065 | 10/1991 | Lampe | 73/23.21 X |
| 5,088,314 | 2/1992 | Takashi | 236/49.3 X |

FOREIGN PATENT DOCUMENTS 62-59319 3/1987 Japan .
62-119338 5/1987 Japan .

*Primary Examiner*—Harry B. Tanner
*Attorney, Agent, or Firm*—Stevens, Davis, Miller & Mosher

[57] ABSTRACT

The level of a signal voltage of a sensor circuit 9 which changes depending upon the environmental change is detected by comparing the signal voltage with a reference voltage which is constant for a period of time longer than the period of the signal voltage and is momentarily and stepwise changed between a plurality of values. A change in the signal voltage is determined by a determining circuit 14 for operating a ventilation fan. Accurate detection of the environmental change can be made at an improved response even if a power source voltage for the sensor circuit 9 is so unstable or is pulsated that the signal voltage of the sensor circuit 9 has a changing amplitude.

2 Claims, 3 Drawing Sheets

APPARATUS FOR CONTROLLING VENTILATION FAN

BACKGROUND OF THE INVENTION

The present invention relates to an apparatus for controlling a ventilation fan, which automatically carries out ventilation in offices, living rooms, kitchens, etc. depending upon an environmental change.

As highly airtight designs for recent residence houses and offices have been advanced, ventilation fans have become more widespread. Automatic ventilating apparatus for automatically carrying out the ventilation depending upon the environmental change have been demanded.

Such a prior art apparatus for controlling a ventilation fan is generally formed as is disclosed in Japanese Unexamined Patent Publication No. Sho 62-59319. The structure of the prior art apparatus will be described with reference to FIG. 5.

The apparatus for controlling a ventilation fan comprises a sensor circuit 101 for detecting an environmental change (for example, pollution of indoor air) to generate a d.c. voltage, a reference voltage generating circuit 102 for changing a reference voltage with the lapse of time by capacitors and a resistor and the like, a comparing, operating and amplifying circuit 103 and a determining circuit 104 as shown in the drawing.

The operation of the thus formed apparatus for controlling the ventilation fan will now be described with reference to FIGS. 5 and 6.

Pollution of indoor air is detected by the sensor circuit 101, which feeds to the comparing, operating and amplifying circuit 103 a d.c. signal voltage D depending upon the level of pollution of the air. The comparing, operating and amplifying circuit 103 compares the signal voltage D with a reference voltage E which is generated by the reference voltage generating circuit 102. The determining circuit 104 detects a change in the signal voltage D from the sensor circuit 101 (Fa or Fb) based upon a result of comparison and a voltage instruction which has been fed to the reference voltage generating circuit 102 for operating the ventilation fan.

SUMMARY OF THE INVENTION

If a changing amplitude voltage such as a ripple generated in the signal voltage D of the sensor circuit 101 due to a fact that the power source voltage of the sensor circuit 101 is unstable or is changed in a pulsated manner, the voltage detected at a crossing point between the reference voltage E and the d.c. voltage D varies in a range between Fa and Fb. Therefore, such a prior apparatus for controlling a ventilation fan can not accurately detect the environmental change. Since the reference voltage generating circuit comprises capacitors and resistors, it is involved with a time constant. Since the voltage can not be increased for a short period of time by making the gradient of the change in the reference voltage E higher, the response of detection of the pollution of the indoor air is low.

The present invention aims at solving the above mentioned problem.

It is, therefore, an object of the present invention to provide an apparatus for controlling a ventilation fan having an excellent response which is capable of accurately detecting the indoor air pollution even if the signal voltage of a sensor circuit has a changing amplitude voltage.

In order to accomplish the above mentioned object, in an aspect of the present invention there is provided a device for controlling a ventilation fan, comprising: a sensor circuit for generating a signal voltage which changes depending upon an environmental change; means for detecting the signal voltage by comparing the signal voltage from said sensor circuit with a reference voltage which is constant for a period of time longer than the period of the signal voltage and is momentarily and stepwise changed to assume a plurality of values; and means for determining the operation of a ventilation fan depending upon a change in the signal voltage which is detected by said detecting means.

In another aspect of the present invention, there is provided a device for controlling a ventilation fan, comprising: a sensor circuit for generating a signal voltage which changes depending upon an environmental change; means for detecting the signal voltage by comparing the signal voltage from said sensor circuit with a reference voltage which is constant for a period of time longer than the period of the signal voltage and is momentarily and stepwise changed to assume a plurality of values by means of a combination of a plurality of resistors, the resistances of which increase by step of double as high as one resistor, and means for determining the operation of a ventilation fan depending upon a change in the signal voltage which is detected by said detecting means.

Even if the signal voltage of the sensor circuit has a changing amplitude voltage such as a ripple due to instability or pulsation of the power source voltage for the sensor circuit in the former apparatus, the detecting circuit compares the signal voltage with a reference voltage which is constant for a period of time longer than the changing amplitude voltage and is momentarily and stepwise changed to detect the polar value of the amplitude of the signal E. Accordingly, the environmental change can be accurately detected and detection in which the response has been improved can be made.

Even if the signal voltage of the sensor circuit has a changing amplitude voltage such as a ripple due to instability or pulsation of the power source voltage for the sensor circuit in the latter apparatus, the detecting circuit compares the signal voltage with a reference voltage which is constant for a period of time longer than the ripple and is momentarily and stepwise changed between a plurality of values by a combination of a plurality of resistors to detect the polar value of the amplitude of the signal E. Accordingly, the environmental change can be accurately detected and detection in which the response has been improved can be made since plural stepwise voltages are switched only by resistors.

DESCRIPTION OF THE PREFERRED EMBODIMENTS

Figure 1:
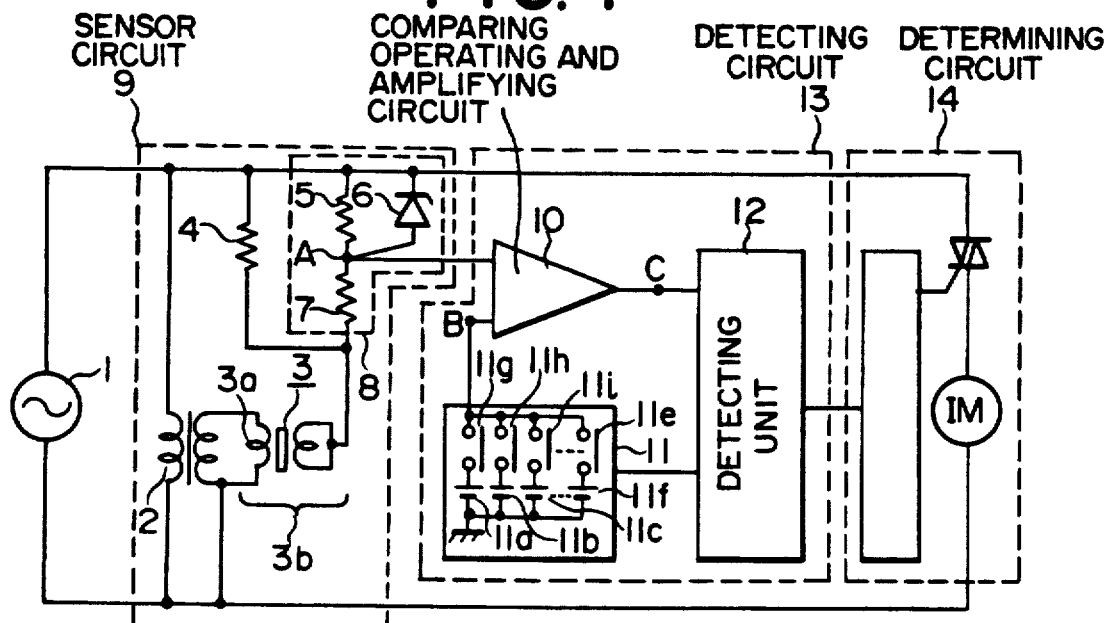
FIG. 1 is a block diagram showing the structure of an apparatus for controlling a ventilation fan in a first embodiment of the present invention.

A first embodiment of the present invention will be described with reference to FIGS. 1 and 2.

A sensor 3 comprises a heater portion 3a which is connected to a power source 1 via a transformer 2, and a resistor portion 3b having a resistance which varies with an environmental change. The sensor 3 is connected to the power source 1 via a fixed resistor 4 which is connected in parallel with the resistor portion 3b. The fixed resistor 4 is connected in parallel with a voltage dividing circuit 8 comprising a parallel circuit of a resistor 5 and a Zener diode 6 and a resistor 7 which is series connected with the parallel circuit at a point A. The transformer 2, the sensor 3, the fixed resistor 4 and the voltage dividing circuit 8 form a sensor circuit 9 which is encircled by a dotted line. The sensor circuit 9 is connected at the point A to one of two input terminals of a comparing, operating and amplifying circuit 10 having one output terminal C. A voltage generating circuit 11 for changing reference voltages by momentarily switching a plurality of voltage sources 11a, 11b, 11c, ..., 11f by a plurality of switches 11g, 11h, 11i, ..., 11l is connected to the other input terminal B of the comparing, operating and amplifying circuit 10. The comparing, operating, and amplifying circuit 10 is connected at the output terminal thereof to a detecting unit 12 which issues a voltage instruction to the voltage generating circuit 11 and detects a signal voltage from the sensor circuit 9 by determining whether the voltage at the point c is a high level or low level voltage. The comparing, operating and amplifying circuit 10 compares the signal voltage at the point A with the reference voltage switched by the voltage generating circuit 11 to select one of the high and low voltages on the output terminal C. The comparing, operating and amplifying circuit 10, the voltage generating circuit 11 and the detecting circuit 12 constitute detecting circuit 13. Determining circuit 14 for operating a ventilation fan in response to a change in the signal voltage is connected to the detecting circuit 12.

Figure 2:
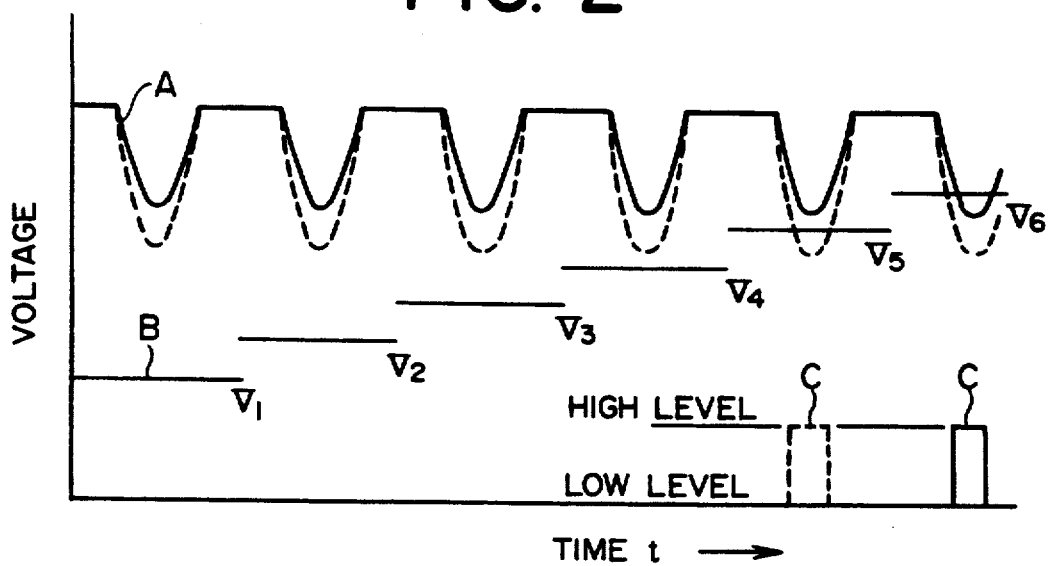
FIG. 2 is a view showing the wave forms of signal voltages on various components of the control apparatus.

When the voltage of the power source for the sensor circuit 9 which generates the signal voltage depending upon the environment in a room changes in a pulsated manner in the above mentioned structure, a periodic amplitude represented by a solid line A in FIG. 2 occurs in the signal voltage at the point A and the signal voltage is applied to the one terminal of the comparing, operating and amplifying circuit 10. On the other hand, the detecting unit 12 issues a voltage instruction to the voltage generating circuit 11. In response to the voltage instruction, the voltage generating circuit 11 reproduces reference voltage B which momentarily changes in a stepwise manner as V1, V2 ..., V6 at time intervals each longer than one period of the changing amplitude in the signal voltage at the point A. The comparing, operating and amplifying circuit 10 receives the signal voltage A from the sensor circuit 9 and the reference voltage B and compares them with each other and determines that the voltage C on the output terminal C is at the high level when the reference voltage B is higher than the signal voltage A. When the detecting unit 12 receives the voltage C on the output terminal C, it determines that the voltage on the output terminal C is at the high level and detects the signal voltage A (for example, V6) from the issued voltage instruction and the determined voltage level. The signal voltage A which is detected by the detecting unit 12 is fed to determining circuit 14. In response to the signal voltage A, the determining circuit 14 determines an environmental change based upon a difference between the previously and currently fed signal voltages.

When the environment in the room becomes worse from cigarette smoke and the like, the signal voltage at the point A changes as represented by a dotted line in FIG. 2 and the detecting unit 12 detects the signal voltage in a manner V5 as similar to the foregoing. The determining circuit 14 determines from the previously and currently received signal voltages that the signal voltage A changes from V6 to V5 and that the environment becomes worse and then operates the ventilation fan.

The apparatus for controlling the ventilation fan in the first embodiment of the present invention is capable of accurately detecting the signal voltage from the sensor circuit by comparing the signal voltage with the reference voltage which is stepwise obtained by momentarily switching the plurality of voltage sources at time intervals each longer than one period of the changing amplitude even if the signal voltage of the sensor circuit depending upon the environmental conditions has a changing amplitude. The control is capable of quickly and stepwise generating the reference voltage by switching the plurality of voltage sources so that detection of a fast response can be made.

Figure 3:
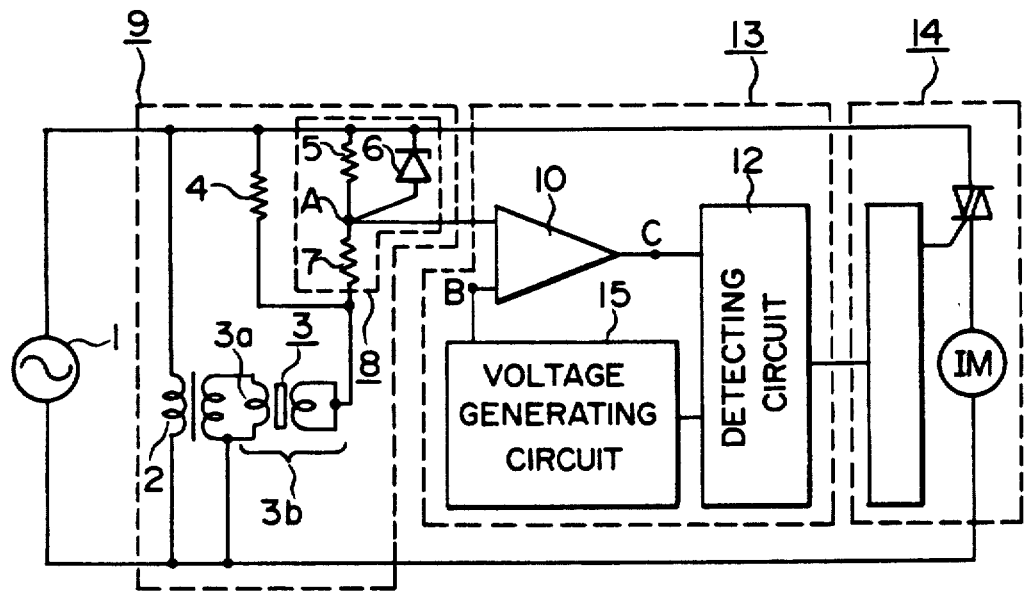
FIG. 3 is a block diagram showing the structure of an apparatus for controlling a ventilation fan in a second embodiment of the present invention.
Figure 4:
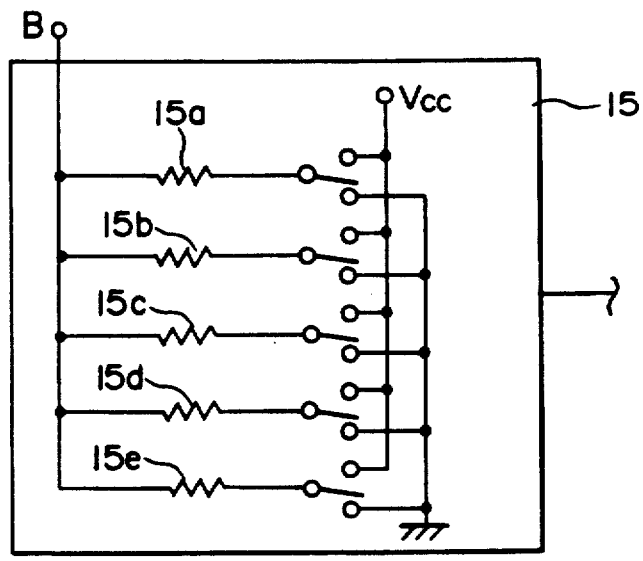
FIG. 4 is a circuit diagram showing a voltage generating circuit in the control apparatus.
Figure 5:
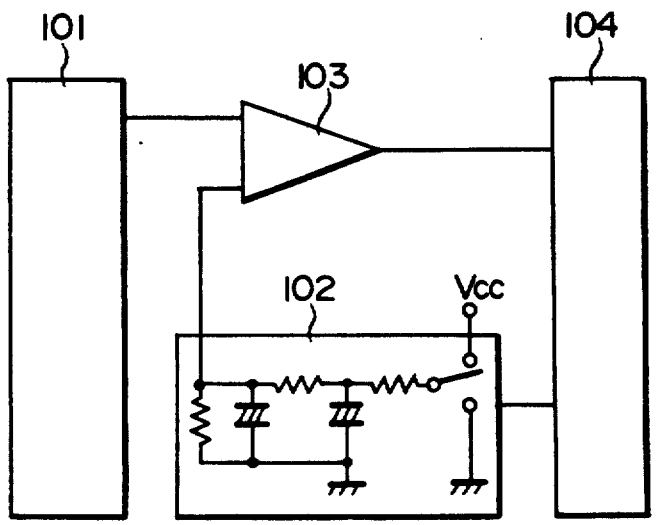
FIG. 5 is a block diagram showing the structure of a control for controlling apparatus of the prior art a ventilation fan.
Figure 6:
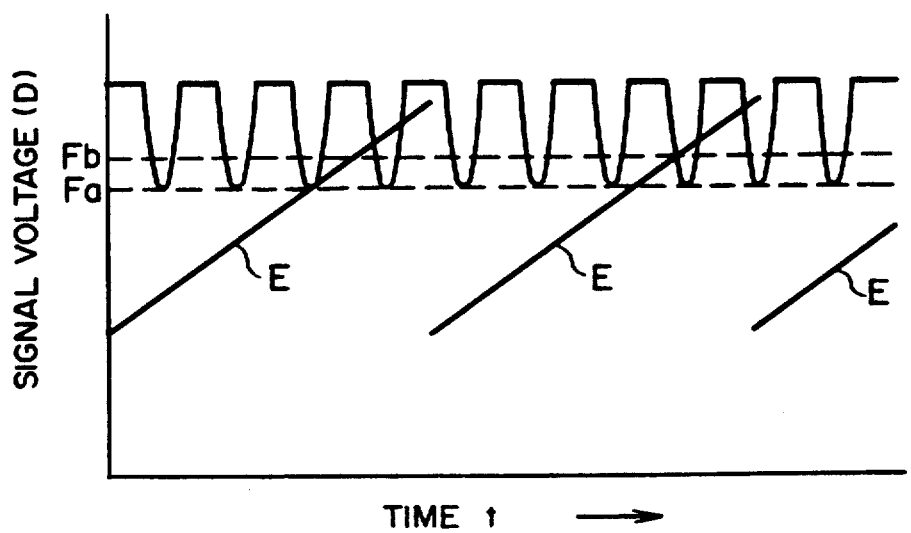
FIG. 6 is a wave form view showing signal voltages on various components in the control apparatus of the prior art.

A second embodiment of the present invention will be described with reference to FIGS. 3 and 4.

Like components which are identical with those in the first embodiment are represented by like reference numerals. Duplication of description of like components will be omitted herein. The voltage generating circuit 11 stepwise changes the reference voltages by sequentially switching the plurality of voltage sources. In contrast to this, the voltage generating circuit 15 is the second embodiment comprises a first resistor 15a having a resistance of R, a second resistor 15b having a resistance of 2R, a third resistor 15c having a resistance of 4R, a fourth resistor 15d having a resistance of 8R, and a fifth resistor 15e having a resistance of 16R so that the resistances of the resistors increases by step of times of nth power of 2 such as 2 times, 4 times and 16 times as high as the resistance of the first resistor 5a.

The resistors are connected with each other at one end and are connected at the other ends to a power source voltage Vcc or ground. The reference voltage is stepwise switched by connecting one of the resistors to the power source voltage Vcc at the other end thereof.

In the above mentioned structure, the signal voltage at the point A of the sensor circuit 9 depending upon the environment in the room is compared with the reference voltage B which is stepwise generated as V1, V2, ... V32 (only V1 to V6 are represented in the drawing) by the voltage generating circuit 15. The output of the comparing, operating and amplifying circuit 10 is detected by the detecting unit 12 and is fed to the determining circuit 14. If there is a change between the previously fed signal voltage and the currently fed signal voltage as is similar to the first embodiment, the determining circuit 14 determines that there is a change in environment and operates the ventilation fan.

The controlling apparatus for the ventilation fan in the second embodiment provides the same effects as those of the first embodiment and is capable of generating the 5th power of 2 steps of reference voltages by connecting with each other the end of 5 resistors, the resistances of which increase by steps of times of nth power of 2 times as high as the resistance of one resistor and switching the other ends of the resistors between the power source voltage Vcc and the ground voltage. This enables a more finer detection of the signal voltage. Generation of a plurality of reference voltages only by switching resistors enables detection of a fast response.

Although a given number of reference voltages (V1 . . . V6 or V1 . . . V32) are stepwise generated in the foregoing embodiments, it is to be understood that the number of steps of the reference voltages is not limited.

As is apparent from the above mentioned embodiment, the present invention provides a control for a ventilation fan which is capable of detecting from a sensor circuit a signal voltage having an amplitude which oscillates at a predetermined period and which changes depending upon environmental change by comparing the signal voltage with reference voltages which are momentarily and stepwise changed over a plurality of values and which assume a given valve for a period of time longer than one period of the signal voltage even if the signal voltage is so unstable that it has changing amplitude such as ripple.

The present invention provides a controlling apparatus for a ventilation fan in which the gradient of the change in the reference voltage is not limited by momentarily and stepwise changing the reference voltages by a circuit having no time constant defined by a capacitance and a resistance whereby detection of a fast response which is enhanced by making the switching speed higher can be made.

I claim:

1. A device for controlling a ventilation fan, comprising:
    a sensor circuit for generating a signal voltage having an amplitude which oscillates at a predetermined period and changes depending upon an environmental change;
    means for detecting the signal voltage by comparing the signal voltage from said sensor circuit with a reference voltage which is constant for a period of time longer than the predetermined period of the signal voltage and is momentarily and stepwise changed to assume a plurality of values; and
    means for controlling the operation of a ventilation fan depending upon a change in the signal voltage which is detected by said detecting means.

2. A device for controlling a ventilation fan, comprising:
    a sensor circuit for generating a signal voltage having an amplitude which oscillates at a predetermined period and changes depending upon an environmental change;
    means for detecting the signal voltage by comparing the signal voltage from said sensor circuit with a reference voltage which is constant for a period of time longer than the predetermined period of the signal voltage and is momentarily and stepwise changed to assume a plurality of values by means of a combination of a plurality of resistors, the resistances of which increase by step of double as high as one resistor, and
    means for controlling the operation of a ventilation fan depending upon a change in the signal voltage which is detected by said detecting means.

* * * * *